US012689676B2

(12) United States Patent
Weston et al.

(10) Patent No.: US 12,689,676 B2
(45) Date of Patent: Jul. 21, 2026

(54) SYSTEMS AND METHODS TO CONTROL VEHICLE OPERATION UPON USER ARRIVAL

(71) Applicant: Ford Global Technologies, LLC, Dearborn, MI (US)

(72) Inventors: Keith Weston, Canton, MI (US); Derek Bier, Ann Arbor, MI (US)

( * ) Notice: Subject to any disclaimer, the term of this patent is extended or adjusted under 35 U.S.C. 154(b) by 86 days.

(21) Appl. No.: 18/774,422

(22) Filed: Jul. 16, 2024

(65) Prior Publication Data

US 2026/0025432 A1     Jan. 22, 2026

(51) Int. Cl.
| | |
|---|---|
| *H04L 67/125* | (2022.01) |
| *B60W 50/10* | (2012.01) |
| *G06V 20/56* | (2022.01) |
| *G07C 9/00* | (2020.01) |
| *H04W 4/40* | (2018.01) |

(52) U.S. Cl.
CPC .......... *H04L 67/125* (2013.01); *B60W 50/10* (2013.01); *G06V 20/56* (2022.01); *G07C 9/00309* (2013.01); *H04W 4/40* (2018.02); *B60W 2420/403* (2013.01); *B60W 2540/041* (2020.02); *B60W 2710/30* (2013.01); *G07C 2009/00531* (2013.01)

(58) Field of Classification Search
None
See application file for complete search history.

(56) References Cited

U.S. PATENT DOCUMENTS

| | | | | |
|---|---|---|---|---|
| 6,718,240 B1 * | 4/2004 | Suda | .................. | G07C 9/00182 |
| | | | | 340/5.72 |
| 7,193,509 B2 * | 3/2007 | Bartels | .................... | G08G 1/166 |
| | | | | 340/436 |
| 10,717,412 B2 * | 7/2020 | Abel Rayan | ............ | B60R 25/31 |
| 10,798,154 B2 | 10/2020 | Lovett et al. | | |
| 11,131,555 B2 * | 9/2021 | Canella | .............. | G01C 21/3453 |
| 11,420,593 B2 * | 8/2022 | Moeller | ................ | B60R 25/305 |
| 2002/0097145 A1 * | 7/2002 | Tumey | .................. | B60R 25/255 |
| | | | | 340/5.53 |

(Continued)

FOREIGN PATENT DOCUMENTS

| | | |
|---|---|---|
| DE | 102021118157 A1 | 1/2023 |
| JP | 2006282116 A | 10/2006 |

OTHER PUBLICATIONS

Aptiv, What is a Software-Defined Vehicle?, https://www.aptiv.com/en/insights/article/what-is-a-software-defined-vehicle, Mar. 19, 2020, pp. 1-4.

*Primary Examiner* — Carlos Garcia
(74) *Attorney, Agent, or Firm* — Frank Lollo; Eversheds Sutherland (US) LLP

(57) ABSTRACT

A vehicle including a sensor unit and a processor is disclosed. The sensor unit may be configured to detect a presence of a user in proximity to the vehicle. The processor may be configured to determine a user presence in proximity to the vehicle based on inputs obtained from the sensor unit, and obtain a user preference associated with a preferred vehicle activation mode, from a plurality of vehicle activation modes, responsive to determining the user presence. The processor may further activate the preferred vehicle activation mode, and control an operation of a vehicle component based on the preferred vehicle activation mode.

20 Claims, 6 Drawing Sheets

(56) References Cited

U.S. PATENT DOCUMENTS

| | | | |
|---|---|---|---|
| 2005/0280518 A1* | 12/2005 | Bartels ................... | B60Q 9/008 |
| | | | 340/691.3 |
| 2016/0288770 A1 | 10/2016 | Hermann et al. | |
| 2017/0232933 A1* | 8/2017 | Nishidai ................ | B60R 25/24 |
| | | | 340/5.61 |
| 2018/0187460 A1* | 7/2018 | Gordon .................... | G07C 9/00 |
| 2020/0186590 A1* | 6/2020 | Penilla ................. | B60L 53/665 |
| 2023/0326325 A1* | 10/2023 | Bedford ................ | G08B 13/22 |
| | | | 340/539.11 |

* cited by examiner

600

602  Start

604  Determine a user presence in proximity to a vehicle

606  Obtain a user preference

608  Activate a preferred vehicle activation mode

610  Control an operation of a vehicle component

612  Stop

SYSTEMS AND METHODS TO CONTROL VEHICLE OPERATION UPON USER ARRIVAL

FIELD

The present disclosure relates to systems and methods to control operation of one or more vehicle components based on user preferences, when a user approaches a vehicle.

BACKGROUND

Vehicle closures or entry points, such as doors, tailgate, etc., are used by users to enter or exit a vehicle. A vehicle entry point may be unlocked or locked by a user by using a user device, a key fob, and/or a door handle when the user may be located in proximity to the vehicle. While such means of locking or unlocking the vehicle entry point may provide convenience to the user, there are instances when the user may desire more features that enhance the experience of approaching and entering the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
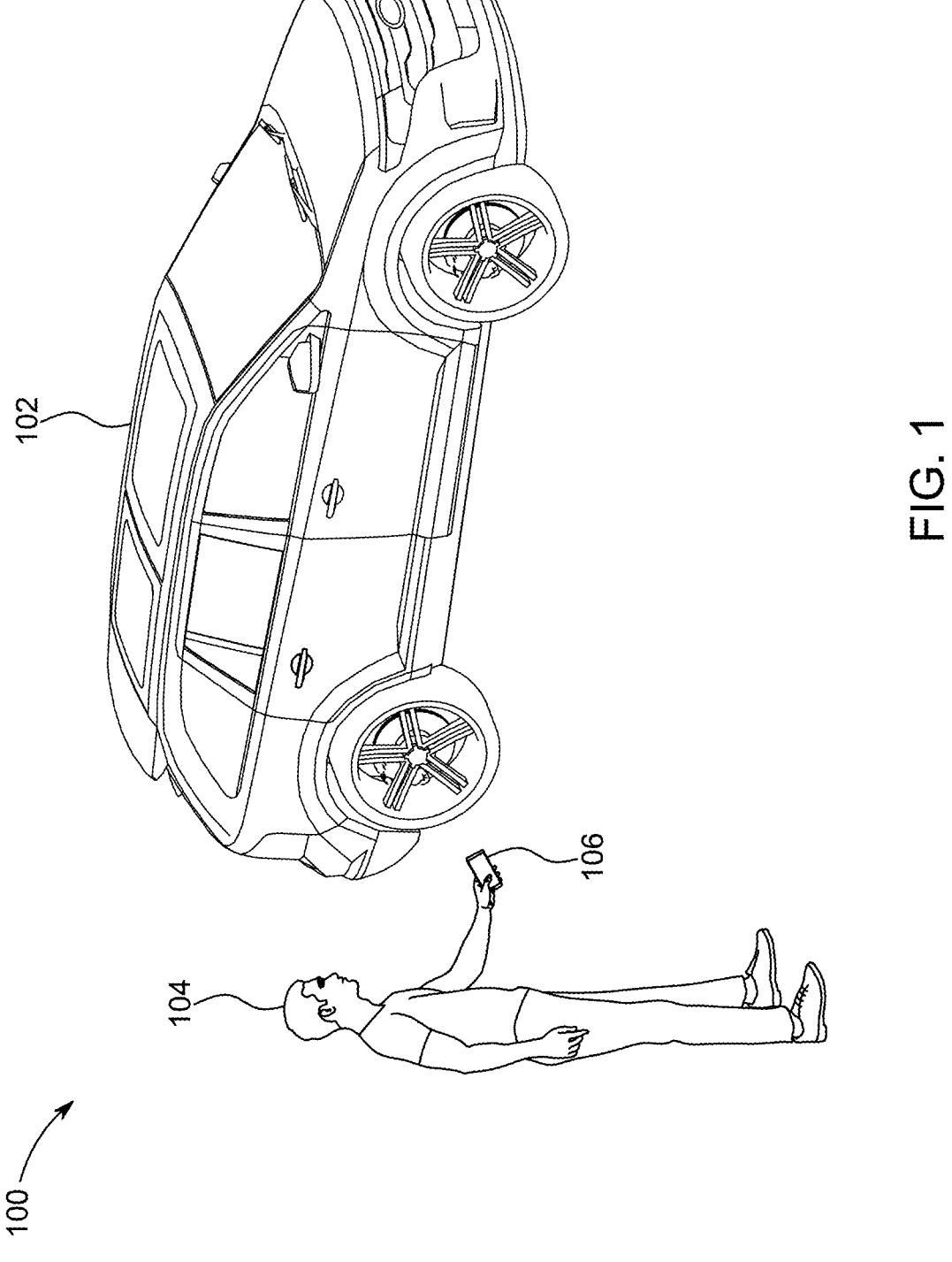
FIG. 1 depicts an environment in which techniques and structures for providing the systems and methods disclosed herein may be implemented.

The present disclosure describes a vehicle that may activate and control operation of one or more vehicle components as per user preferences when a user approaches the vehicle. Specifically, the vehicle may be configured to operate in a plurality of different activation or arrival modes based on user preferences when the user may be approaching the vehicle (e.g., to enter a vehicle interior portion via a vehicle door or tailgate).

In some aspects, when the user may be approaching the vehicle, the vehicle may determine the user presence in proximity to the vehicle based on inputs obtained from a vehicle sensor unit. Responsive to determining the user presence, the vehicle may obtain (from a user device, a server, a vehicle memory, etc.) user preferences associated with a preferred vehicle activation mode and/or a preferred sequence in which the user may desire the vehicle entry members (e.g., doors and/or the tailgate) to unlock (and then relock) as the user approaches close to the vehicle. Responsive to obtaining the user preferences, the vehicle may activate the preferred vehicle activation mode and automatically unlock/relock one or more vehicle doors/tailgate based on the user preferences.

In an exemplary aspect, when the preferred vehicle activation mode is a first mode or a "stealth" mode, the vehicle may not activate any vehicle lights, sound systems, vehicle engine, etc., as the user approaches the vehicle. In this case, the vehicle may unlock the door that the user desires to be unlocked first when the user approaches close to the vehicle, without drawing any unnecessary focus towards the user/vehicle.

In another aspect, when the preferred vehicle activation mode is a second mode or a "panic alarm" mode, the vehicle may activate the vehicle lights, the sound systems, and/or the vehicle engine in a first predefined pattern, as the user approaches the vehicle. In this case, the vehicle may activate the vehicle components in the first predefined pattern to draw other users or passersby focus towards the user/vehicle, when the user approaches close to the vehicle. The user may prefer the vehicle to activate in the "panic alarm" mode when the user may be scared or may require support of other users.

In yet another aspect, when the preferred vehicle activation mode is a third mode or a "show off my car" mode, the vehicle may activate the vehicle lights, the sound systems, and/or the vehicle engine in a second predefined pattern, as the user approaches the vehicle. In this case, the vehicle may activate the vehicle components in the second predefined pattern (e.g., flashing vehicle lights in an entertaining manner and/or outputting fun tunes/songs) to show off vehicle features to users or passersby located in proximity to the vehicle. The user may prefer the vehicle to activate in the "show off my car" mode when the user desires to show off the vehicle to user's friends or other users.

In further aspects, when the user approaches close to the vehicle, the vehicle may automatically unlock and relock vehicle entry members as per the sequence preferred by the user. For example, when the user desires to place a kid or grocery items in a vehicle rear interior portion, the user may indicate in the user preferences that the user desires a vehicle rear door to unlock first when the user approaches close to the vehicle (and provides a door unlock command to the vehicle). Further, the user may indicate that the user desires the vehicle rear door to automatically close and relock when the user has optimally placed the kid or the grocery items in the vehicle rear interior portion. Furthermore, the user may indicate that the vehicle's driver door should automatically unlock when the vehicle rear door is relocked and the user moves towards the driver door. The vehicle may be configured to unlock/relock the vehicle entry members/door in the manner as described above, based on the user preferences.

In additional aspects, the vehicle may activate or switch ON the vehicle engine as per the user preferences. In one exemplary aspect, the vehicle may switch ON the vehicle engine when the preferred vehicle activation mode is activated so that the vehicle engine may power the operation of the vehicle components described above (e.g., the vehicle lights, the sound systems, the doors, etc.) and not consume vehicle's battery energy. In a second exemplary aspect, the vehicle may switch ON the vehicle engine after the preferred vehicle activation mode is deactivated, so that noise associated with the vehicle engine operation is not generated when the preferred vehicle activation mode may be enabled/activated. The user may prefer this mode of operation when the preferred vehicle activation mode may be the stealth mode, and the user may not desire to draw any unnecessary focus. In this case, the vehicle battery may power the operation of the vehicle components described above, when the preferred vehicle activation mode is enabled/activated.

The present disclosure discloses a vehicle that enhances user's experience of approaching and accessing the vehicle. The vehicle activates one or more vehicle components in the manner preferred by the user, as the user approaches the vehicle. Further, the vehicle automatically unlocks, closes, and relocks the vehicle doors/tailgate based on the user's preferred sequence, so that the user may conveniently access and enter the vehicle.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a user 104 who may be approaching the vehicle 102. In an exemplary aspect, the user 104 may an owner of the vehicle 102, or the vehicle 102 may be associated with the user 104. The vehicle 102 may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain such as a gasoline engine, one or more electrically-actuated motor(s), a hybrid system, etc.

In some aspects, the user 104 may desire one or more vehicle components to operate or activate in a predefined manner as per user preferences, when the user 104 approaches the vehicle 102 and/or when the user 104 is about to enter the vehicle 102. The vehicle 102 may be configured to obtain the user preferences when the user 104 approaches the vehicle 102 and control the vehicle component operation based on the user preferences to enhance user's experience of approaching and accessing the vehicle 102, as briefly described below and described in detail later in conjunction with FIG. 2.

In an exemplary aspect, the user preferences associated with the vehicle component operation may be based on the condition of the surroundings in which the vehicle 102 may be located, or based on the situation in which the user 104 may be in or a type of job/activity that the user 104 may be performing in proximity to the vehicle 102. In other aspects, the user preferences may be based on user's typical likes or dislikes and/or the manner in which the user 104 desires the vehicle components to operate/activate whenever the user 104 approaches the vehicle 102.

Figure 2:
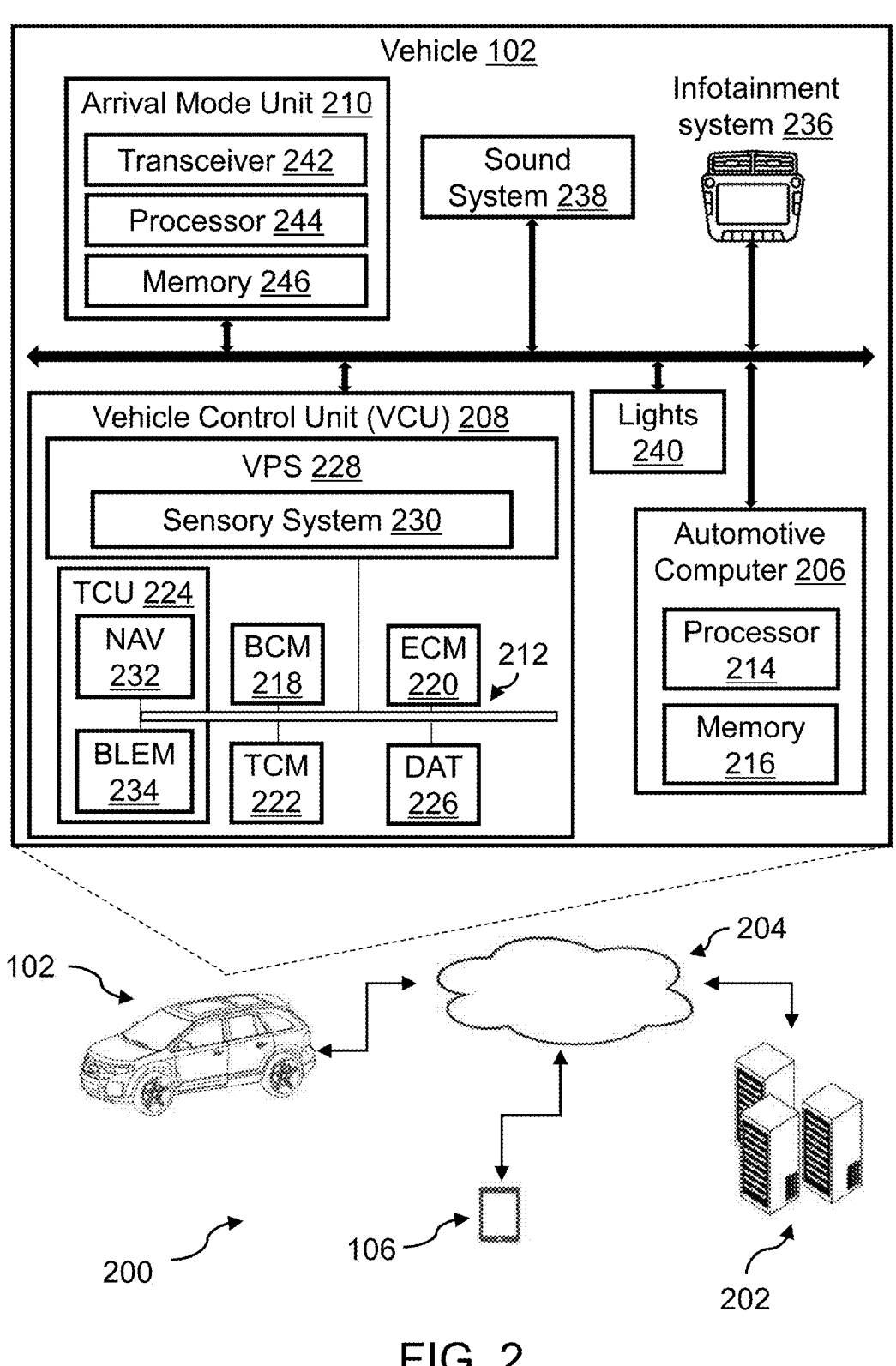
FIG. 2 depicts a block diagram of a system to control vehicle operation upon user arrival in accordance with the present disclosure.

As an example, the user 104 may desire the vehicle 102 not to activate any vehicle lights (e.g., interior and exterior vehicle lights, shown as lights 240 in FIG. 2), sound devices/horns (shown as sound system 238 in FIG. 2), and/or the like when the user 104 may be in a surrounding where the user 104 may not feel comfortable (e.g., where presence of malicious users may be expected). In this case, the user 104 may desire the vehicle 102 to only automatically unlock a driver door (or any other predefined door) when the user 104 may be approaching the vehicle 102, without making any noise or illuminating any lights, so as to draw as little focus as possible on the user 104 and/or the vehicle 102.

As another example, the user 104 may desire the vehicle 102 to activate one or more vehicle lights and/or sound devices/horns in a first predefined manner (e.g., flashing lights at a high frequency and/or outputting predefined alert sounds) or cause the vehicle engine to operate at a first predefined revolutions per minute, when the user 104 approaches the vehicle 102 and the user 104 may be in a situation where the user 104 may desire focus of other users in proximity to the vehicle 102 (e.g., when the user 104 may be scared or in a panic mode, or the vehicle 102 may be located in a dark and lonely surrounding). As yet another example, the user 104 may desire the vehicle 102 to activate one or more vehicle lights and/or sound devices/horns in a second predefined manner (e.g., flashing lights in an entertaining manner and/or outputting predefined fun tunes/sound/songs) or cause the vehicle engine to operate at a second predefined revolutions per minute, when the user 104 approaches the vehicle 102 and the user 104 desires to "show off" the vehicle 102 to user's friends or passersby.

In some aspects, in addition or alternative to the user preferences being associated with a preferred manner of vehicle component operation when the user 104 approaches the vehicle 102 as described above, the user preferences may be associated with a sequence in which one or more vehicle closures or vehicle entry members (e.g., vehicle doors, tailgate, etc.) should be unlocked when the user 104 may be about to enter the vehicle 102. The user preferences may also be associated with the sequence/preference in which the vehicle entry members should be closed and/or relocked, after the vehicle entry members have been unlocked and opened. As an example, if the user 104 is associated with authorities (e.g., Police) and is making a malicious user/suspect (not shown) enter the vehicle 102, the user 104 may prefer a vehicle rear door to automatically unlock first (while the other doors to remain locked), when the user 104 may be attempting to make the suspect enter the vehicle 102 via the vehicle rear door. Thereafter, when the suspect is placed in the vehicle 102, the user 104 may desire the vehicle rear door to automatically close (if automatic vehicle door closing feature is available in the vehicle 102) and relock. Furthermore, the user 104 may desire the vehicle driver door to unlock next when the user 104 may be approaching the vehicle driver door, so that the user 104 may comfortably enter and drive the vehicle 102. In this manner, the user 104 may ensure that the suspect (or any other user) may not enter or exit the vehicle 102 intentionally or unintentionally, thereby ensuring that the suspect does not escape.

As another example, when the user 104 may be carrying a kid or grocery items, the user 104 may prefer a vehicle rear door to automatically unlock first (while the other doors to remain locked) when the user 104 may be placing the kid or the grocery items in the vehicle interior portion via the vehicle rear door. Thereafter, when the kid or the grocery items are optimally placed in the vehicle 102, the user 104 may desire the vehicle rear door to automatically close and relock. Furthermore, the user 104 may desire the vehicle driver door to unlock when the user 104 may be approaching the vehicle driver door, so that the user 104 may comfortably enter and drive the vehicle 102.

As yet another example, if the vehicle 102 is a delivery vehicle and the user 104 is a delivery personnel, the user 104 may prefer the tailgate to unlock (while other doors to remain locked) when the user 104 reaches a destination location and approaches the tailgate. Further, the user 104 may prefer all the vehicle entry members (including the tailgate) to automatically lock when the user 104 moves away from the vehicle 102 (e.g., to deliver a package to a destination address), thereby ensuring that the remaining delivery packages in the vehicle 102 are optimally secured.

In some aspects, the vehicle 102 may be configured to obtain information associated with the user preferences described above and control operation of one or more vehicle components based on the user preferences. In one exemplary aspect, the vehicle 102 may obtain the information associated with the user preferences from a user device 106 that the user 104 may be carrying, or any other device (e.g., a key fob, not shown) associated with the user 104. In this case, the user 104 may transmit the user preferences to the vehicle 102 via the user device 106 and/or the key fob, as the user 104 may be approaching the vehicle 102. For example, if the user 104 may be scared, the user 104 may transmit, via the user device 106, the user preferences to the vehicle 102, indicating that the user 104 prefers the vehicle 102 not to activate vehicle lights, horns, and/or the vehicle engine when the user 104 is approaching the vehicle 102. Further, in this case, the user 104 may indicate in the user preferences that only the vehicle driver door should be unlocked and no other door should be unlocked. Furthermore, the user 104 may indicate that the vehicle driver door should automatically be relocked when the user 104 enters the vehicle 102.

In a second exemplary aspect, the vehicle 102 may obtain the information associated with the user preferences from a memory (shown as memory 246 in FIG. 2) or a server (shown as server 202 in FIG. 2) when the user 104 may be approaching the vehicle 102 or located in proximity to the vehicle 102. In this case, the memory or the server may pre-store the information associated with the user preferences, which may be provided by the user 104 in advance to the memory or the server via the user device 106, a vehicle Human-Machine Interface (HMI, shown as infotainment system 236 in FIG. 2), and/or the like. As an example, when the user 104 desires the vehicle 102 to flash vehicle lights in a predefined manner, the vehicle sound system to play a predefined welcome music and unlock only the driver door whenever the user 104 is in proximity to or approaching the vehicle 102. The user 104 may cause the memory or the server to pre-store such user preferences.

In some aspects, the vehicle 102 may obtain the information associated with the user preferences from the user device 106, the key fob, the memory and/or the server (as described above) when the user 104 may located in proximity to the vehicle 102 and approaching the vehicle 102. Based on the obtained information, the vehicle 102 may determine the user preferences associated with a preferred vehicle activation mode (from a plurality of vehicle activation modes) in which the user 104 may desire the vehicle 102 to automatically activate one or more vehicle components upon user arrival in proximity to the vehicle 102 and/or a preferred vehicle entry member/door unlocking and relocking sequence (from a plurality of vehicle entry member unlocking and relocking sequences) in which the user 104 may desire the vehicle entry members/doors to automatically unlock (and then relock) when the user 104 approaches close to the vehicle 102.

Responsive to determining the preferred vehicle activation mode and/or the preferred vehicle entry member unlocking and relocking sequence, the vehicle 102 may activate one or more vehicle components (e.g., vehicle lights, sound system/horn, engine, etc.) and/or unlock/relock the vehicle door(s) based on the preferred activation mode and the sequence when the user 104 approaches the vehicle 102. In this manner, the user 104 gets an optimal experience of approaching and entering the vehicle 102 as per user's preferences and requirements, which may be based on user's typical likes or dislikes, the specific situation/context in the which the user 104 may be in, and/or the condition of the surroundings in which the vehicle 102 may be located.

Further vehicle details and the process implemented by the vehicle 102 to control vehicle component operation based on the preferred vehicle activation mode and/or the preferred vehicle entry member unlocking and relocking sequence are described below in conjunction with FIG. 2.

The vehicle 102 and/or the user 104 implement and/or perform operations, as described here in the present disclosure, in accordance with the owner manual and safety guidelines. In addition, any action taken by the user 104 based on the notifications/recommendations provided by the vehicle 102 should comply with all the rules specific to the location and operation of the vehicle 102 (e.g., Federal, state, country, city, etc.). The notifications/recommendations, as provided by the vehicle 102, should be treated as suggestions and only followed according to any rules specific to the location and operation of the vehicle 102.

FIG. 2 depicts a block diagram of a system 200 to control vehicle operation upon user arrival in accordance with the present disclosure. While describing FIG. 2, references will be made to FIGS. 3, 4 and 5.

The system 200 may include the vehicle 102, the user device 106 and one or more servers 202 (or a server 202) communicatively coupled with each other via one or more networks 204. The user device 106 may be, for example, a mobile device, a laptop, a tablet, a smartwatch, or any other device having communication capability. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet.

In further aspects, the server 202 may be configured to receive the information associated with the user preferences described above from the user 104 via the user device 106 or any other communication device associated with the user 104. As described above, the user preferences may be associated with a preferred vehicle activation mode, from a plurality of vehicle activation modes, in which the user 104 may desire the vehicle 102 to automatically activate one or more vehicle components upon user arrival in proximity to the vehicle 102. The user preferences may be further associated with a preferred vehicle entry member/door unlocking and relocking sequence, from a plurality of vehicle entry member unlocking and relocking sequences, in which the user 104 may desire the vehicle entry members/doors to automatically unlock (and then relock) when the user 104 approaches close to the vehicle 102.

In additional aspects, the user preferences may be associated with a preferred vehicle engine activation mode, from a plurality of vehicle engine activation modes, in which the user 104 may desire the vehicle 102 to activate or switch ON the vehicle engine, when the user 104 approaches close to the vehicle 102. As an example, to ensure that the vehicle's key-off loads are efficiently managed and the vehicle battery power is not unnecessarily utilized in operating the vehicle components when the user 104 approaches the vehicle 102, the user 104 may prefer the vehicle engine to automatically activate and power the vehicle components when the user 104 approaches the vehicle 102. In this case, the vehicle components may not utilize vehicle battery power to operate and may instead use the power obtained from the vehicle engine, when the user 104 approaches the vehicle 102, thereby conserving the vehicle battery energy. On the other hand, when the user 104 does not desire to draw focus of users/passersby in proximity to the vehicle 102 when the user 104 approaches the vehicle 102 (e.g., when the user 104 may be scared), the user 104 may not desire the vehicle engine to activate till the user 104 is sitting inside the vehicle 102 (thereby ensuring that no engine noise is generated as the user 104 approaches the vehicle 102). In this case, the vehicle components may utilize the vehicle battery power to operate when the user 104 approaches the vehicle 102 and may utilize the power obtained from the vehicle engine only when the vehicle engine is activated (e.g., when the user 104 is sitting inside the vehicle 102 and all vehicle doors are securely locked).

The server 202 may provide the information associated with the user preferences described above to the vehicle 102 at a predefined frequency, or when the vehicle 102 transmits a request to the server 202 to obtain such information.

The network(s) 204 illustrates an example communication infrastructure in which the connected devices discussed in various embodiments of this disclosure may communicate. The network(s) 204 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 206, a Vehicle Control Unit (VCU) 208, and an arrival mode unit 210 (or unit 210). The VCU 208 may include a plurality of Electronic Control Units (ECUs) 212 in communication with the automotive computer 206.

In some aspects, the automotive computer 206 and/or the unit 210 may be installed anywhere in the vehicle 102, in accordance with the disclosure. Further, the automotive computer 206 may operate as a functional part of the unit 210. The automotive computer 206 may be or include an electronic vehicle controller, having one or more processor(s) 214 and a memory 216. Moreover, the unit 210 may be separate from the automotive computer 206 (as shown in FIG. 2) or may be integrated as part of the automotive computer 206.

The processor(s) 214 may be in communication with one or more memory devices in communication with the respective computing systems (e.g., the memory 216 and/or one or more external databases not shown in FIG. 2). The processor(s) 214 may utilize the memory 216 to store programs in code and/or to store data for performing aspects in accordance with the disclosure. The memory 216 may be a non-transitory computer-readable medium or memory storing a vehicle arrival mode program code. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 208 may share a power bus with the automotive computer 206 and may be configured and/or programmed to coordinate the data between vehicle 102 systems, connected servers (e.g., the server(s) 202), and other vehicles (not shown in FIG. 2) operating as part of a vehicle fleet. The VCU 208 may include or communicate with any combination of the ECUs 212, such as a Body Control Module (BCM) 218, an Engine Control Module (ECM) 220, a Transmission Control Module (TCM) 222, a Telematics Control Unit (TCU) 224, a Driver Assistances Technologies (DAT) controller 226, etc. The VCU 208 may further include and/or communicate with a Vehicle Perception System (VPS) 228, having connectivity with and/or control of one or more vehicle sensory system(s) 230. The vehicle sensory system 230 (or "sensor unit") may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, wheel sensors, ambient weather sensors, vehicle internal and external cameras, one or more rain sensors, capacitive moisture sensors, a tire pressure sensor, a charger thermal sensor, ultrasonic sensors, etc. In some aspects, the vehicle sensory system 230 may be configured to detect a presence of a user (e.g., the user 104) in proximity to the vehicle 102, e.g., based on signals/data/images captured by the radar sensors, the lidar sensors, the cameras, and/or the like.

Figure 3:
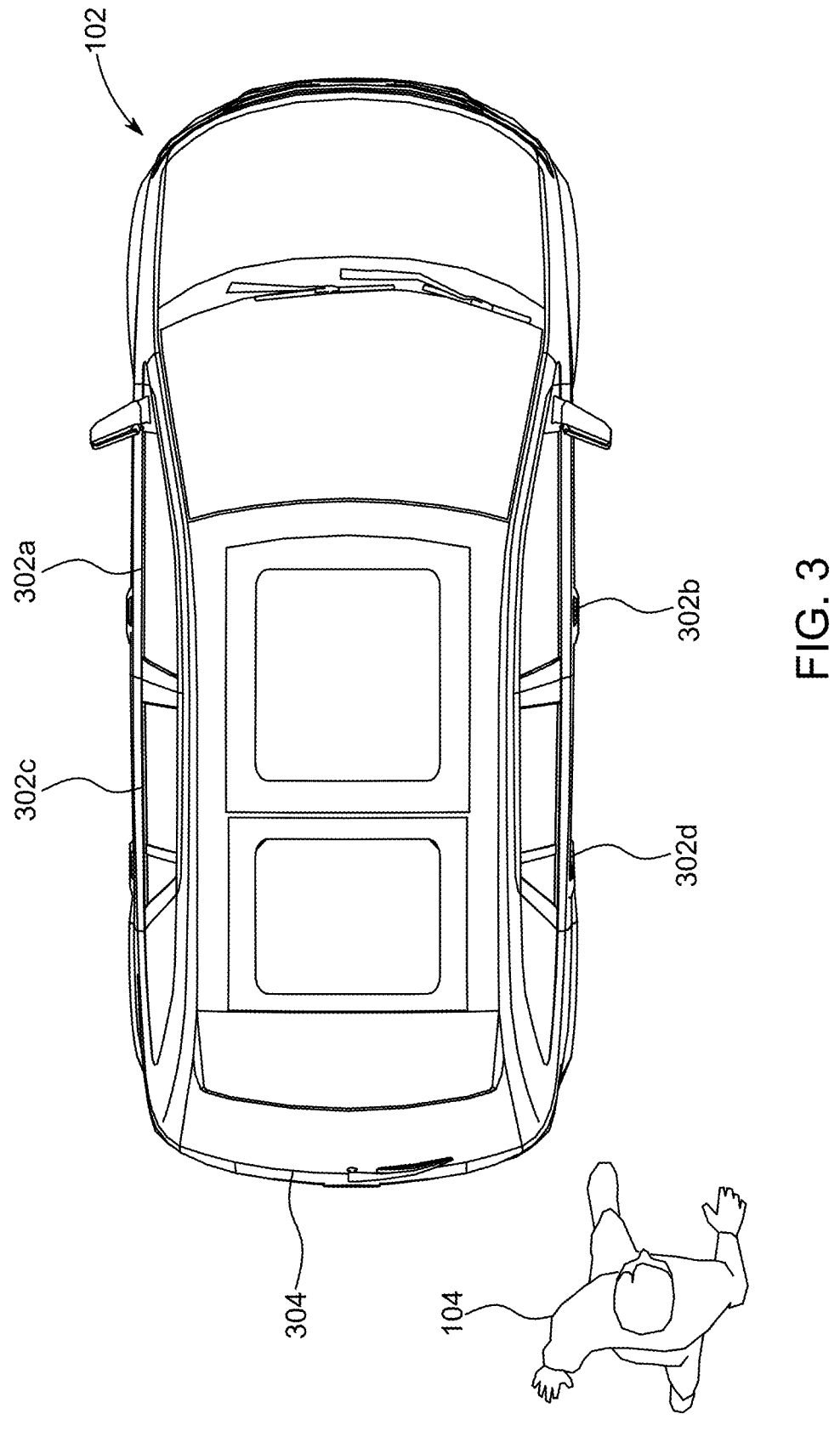
FIG. 3 depicts a top view of a vehicle in accordance with the present disclosure.

In further aspects, the vehicle sensory system 230 may be configured to determine one or more available vehicle entry members or doors that may be available to open (or accessible) and one or more non-available vehicle entry members or doors that may not be available to open (or inaccessible). For example, if the vehicle 102 has four doors 302a, 302b, 302c, 302d and a tailgate 304 (as shown in FIG. 3) that may be used by the user 104 to enter or exit the vehicle 102, the vehicle sensory system 230 may determine those doors/tailgate that may be accessible or openable by the user 104 (i.e., the "available" vehicle entry members) and those doors/tailgate that may be inaccessible or non-openable by the user 104 (i.e., the "non-available" vehicle entry members) due to obstructions. In the example view depicted in FIG. 4, the doors 302a and 302c are shown as obstructed by one or more shopping carts 402. In this case, the vehicle sensory system 230 may determine that the doors 302a and 302c may be unavailable vehicle entry members, and the remaining vehicle doors/tailgate may be available vehicle entry members, based on the signals/data/images captured by the radar sensors, the lidar sensors, the cameras, and/or the like. The example depiction of the shopping carts 402 should not be construed as limiting, and the vehicle doors may be obstructed by any person, object, another vehicle, and/or the like, without departing from the present disclosure scope.

In some aspects, the VCU 208 may control vehicle operational aspects and implement one or more instruction sets received from the user device 106, from one or more instruction sets stored in the memory 216, including instructions operational as part of the unit 210.

The TCU 224 (which may be part of the sensor unit or separate from the sensor unit) may be configured and/or programmed to provide vehicle connectivity to wireless computing systems onboard and off board the vehicle 102 and may include a Navigation (NAV) receiver 232 for receiving and processing a GPS signal, a BLE Module (BLEM) 234, a Wi-Fi transceiver, a UWB transceiver, and/or other wireless transceivers (not shown in FIG. 2) that may be configurable for wireless communication (including cellular communication) between the vehicle 102 and other systems (e.g., the user device 106, a key fob, etc.), computers, and modules. The TCU 224 may be in communication with the ECUs 212 by way of a bus.

The ECUs 212 may control aspects of vehicle operation and communication using inputs from human drivers, inputs from an autonomous vehicle controller, the unit 210, and/or via wireless signal inputs received via the wireless connection(s) from other connected devices, such as the user device 106, the server(s) 202, among others.

The BCM 218 generally includes integration of sensors, vehicle performance indicators, and variable reactors associated with vehicle systems and may include processor-based power distribution circuitry that can control functions associated with the vehicle body such as lights, windows, security, camera(s), headlights, audio system(s), speakers, wipers, door locks and access control, and various comfort controls. The BCM 218 may also operate as a gateway for bus and network interfaces to interact with remote ECUs (not shown in FIG. 2). In some aspects, the BCM 218 may be configured to lock or unlock the doors 302a-d and/or the tailgate 304 based on inputs or command signals obtained from the user device 106, the key fob, the processor 214, the unit 210, and/or the like.

The DAT controller 226 may provide Level-1 through Level-3 automated driving and driver assistance functionality that may include, for example, active parking assistance, vehicle backup assistance, and adaptive cruise control, among other features. The DAT controller 226 may also provide aspects of user and environmental inputs usable for user authentication.

In some aspects, the automotive computer 206 may connect with an infotainment system 236 (or a vehicle Human-Machine Interface (HMI)). The infotainment system 236 may include a touchscreen interface portion and may include voice recognition features, biometric identification capabilities that can identify users based on facial recognition, voice recognition, fingerprint identification, or other biological identification means. In other aspects, the infotainment system 236 may be further configured to receive user instructions/inputs via the touchscreen interface portion and/or display notifications/recommendations, navigation maps, etc. on the touchscreen interface portion.

The vehicle 102 may further include a sound system 238 and one or more internal and external lights 240. The sound system 238 may include speakers, horns, etc. and may be configured to output sound based on inputs or command signals obtained from the user device 106, the key fob, the processor 214, the unit 210, and/or the like. In a similar manner, the lights 240 may be illuminated based on inputs or command signals obtained from the user device 106, the key fob, the processor 214, the unit 210, and/or the like. In some aspects, the BCM 218 may control the operation of the sound system 238 and/or the lights 240.

The computing system architecture of the automotive computer 206, the VCU 208, and/or the unit 210 may omit certain computing modules. It should be readily understood that the computing environment depicted in FIG. 2 is an example of a possible implementation according to the present disclosure, and thus, it should not be considered limiting or exclusive.

In accordance with some aspects, the unit 210 may be integrated with and/or executed as part of the ECUs 212. The unit 210, regardless of whether it is integrated with the automotive computer 206 or the ECUs 212, or whether it operates as an independent computing system in the vehicle 102, may include a transceiver 242, a processor 244, and a computer-readable memory 246.

The transceiver 242 may be configured to receive information/inputs from one or more external devices or systems, e.g., the user device 106, the server(s) 202, and/or the like via the network 204. For example, the transceiver 242 may receive the information associated with the user preferences described above from the user device 106 and/or the server 202 via the network 204. Further, the transceiver 242 may transmit notifications (e.g., alert/alarm signals) to the external devices or systems. In addition, the transceiver 242 may be configured to receive information/inputs from vehicle 102 components such as the infotainment system 236, the vehicle sensory system 230, the TCU 224, and/or the like. Further, the transceiver 242 may transmit notifications (e.g., alert/alarm/command signals) to the vehicle 102 components such as the infotainment system 236, the BCM 218, the sound system 238, the lights 240, etc.

The processor 244 and the memory 246 may be the same as or similar to the processor 214 and the memory 216, respectively. In some aspects, the processor 244 may utilize the memory 246 to store programs in code and/or to store data for performing aspects in accordance with the disclosure. The memory 246 may be a non-transitory computer-readable medium or memory storing the vehicle arrival mode program code. In some aspects, the memory 246 may be configured to store the information associated with the user preferences that the vehicle 102 obtains from the server 202, the user device 106, the key fob, and/or the like.

In operation, the processor 244 may obtain inputs from the vehicle sensory system 230 and the TCU 224 continuously or at a predefined frequency. The processor 244 may determine a user presence (i.e., the presence of the user 104) in proximity to the vehicle 102 based on the obtained inputs. As an example, when the user 104 may be carrying the user device 106 (as shown in FIG. 1) or a key fob, the TCU 224 may establish a communication connection with the user device 106/key fob when the user 104 may be within a predefined radius of the vehicle 102, thereby signaling to the processor 244 that the user 104 is present in proximity to the vehicle 102. In further aspects, the vehicle cameras (that may be part of the vehicle sensory system 230) may capture user images when the user 104 may be located in proximity to the vehicle 102. The processor 244 may obtain the user images from the vehicle cameras and compare them with pre-stored user 104 images (that may be stored in the memory 246). The processor 244 may determine that the user 104 may be present in proximity to the vehicle 102 when the user images obtained from the vehicle cameras match with the pre-stored user 104 images.

Responsive to determining the user presence in proximity to the vehicle 102, the processor 244 may obtain the information associated with the user preferences for the preferred vehicle activation mode, the preferred vehicle entry member/door unlocking and relocking sequence, and/or the preferred vehicle engine activation mode, as described above. In some aspects, the processor 244 may obtain the information associated with the user preferences from the memory 246 and/or the server 202, when the user 104 may have pre-stored such information in the memory 246 and/or the server 202. For example, if the user 104 always desires the vehicle components to get activated/controlled in the same manner whenever the user 104 approaches the vehicle 102, the user 104 may pre-store the information associated with the user preferences in advance in the memory 246 and/or the server 202. In this case, the user 104 may transmit the information associated with the user preferences to the memory 246 and/or the server 202 via the user device 106 and/or the infotainment system 236.

In other aspects, the processor 244 may obtain the information associated with the user preferences directly from the user device 106 and/or the key fob, when the user 104 may be approaching the vehicle 102. As an example, if the vehicle 102 is located in a secluded area and the user 104 is scared, the user 104 may transmit the information associated with the user preferences directly from the user device 106 and/or the key fob as the user 104 approaches the vehicle 102, indicating to the vehicle 102 that the user 104 desires the lights 240 and the sound system 238 to activate when the user 104 is close to the vehicle 102 (e.g., within 1-2 feet of the vehicle 102).

Responsive to obtaining the information associated with the user preferences from the memory 246, the server 202, the user device 106, and/or the like, the processor 244 may determine the user preference associated with a preferred vehicle activation mode (from a plurality of vehicle activation modes), a preferred vehicle entry member unlocking and relocking sequence (from a plurality of vehicle entry member unlocking and relocking sequences), and/or a preferred vehicle engine activation mode (from a plurality of vehicle engine activation modes), based on the obtained information.

Responsive to determining the preferred vehicle activation mode, the processor 244 may activate the preferred vehicle activation mode when the user 104 may be located within a first predefined distance (e.g., 5-10 feet) of the vehicle 102. The processor 244 may then activate and control operation of one or more vehicle components based on the preferred vehicle activation mode, responsive to activating the preferred vehicle activation mode. Examples of preferred vehicle activation modes are described below, which should be construed as limiting.

When the preferred vehicle activation mode is a first mode or a "stealth" mode, the processor 244 may disable or not activate the lights 240, the sound system 238, and the vehicle engine responsive to activating the first mode and responsive to determining that the user 104 is located within the first predefined distance. In some aspects, the user 104 may desire/prefer the first mode or the "stealth" mode of vehicle activation when the user 104 desires as little focus as possible while approaching and accessing the vehicle 102.

When the preferred vehicle activation mode is a second mode or a "panic alarm" mode, the processor 244 may activate the lights 240, the sound system 238, and/or cause the vehicle engine revolutions in a first predefined pattern responsive to activating the second mode and responsive to determining that the user 104 is located within the first predefined distance. The first predefined pattern may include flashing the lights 240 at a high frequency and/or outputting predefined alert sounds from the sound system 238, or causing the vehicle engine to operate at a first predefined revolutions per minute, to gain other users or passersby's focus. In some aspects, the user 104 may desire/prefer the second mode or the "panic alarm" mode of vehicle activation when the user 104 may be scared/panicked and may desire focus/support from other users who may be located in proximity to the vehicle 102.

When the preferred vehicle activation mode is a third mode or a "show off my car" mode, the processor 244 may activate the lights 240, the sound system 238, and/or cause the vehicle engine revolutions in a second predefined pattern responsive to activating the third mode and responsive to determining that the user 104 is located within the first predefined distance. The second predefined pattern may be different from the first predefined pattern described above and may include flashing the lights 240 in an entertaining manner and/or outputting predefined songs from the sound system 238 or cause the vehicle engine to operate at a second predefined revolutions per minute to show off the features of the vehicle 102. In some aspects, the user 104 may desire/prefer the third mode or the "show off my car" mode of vehicle activation when the user 104 desires to show off the vehicle 102 to the user's friends or other users who may be located in proximity to the vehicle 102.

In further aspects, when the preferred vehicle activation mode is the third mode or the "show off my car" mode, the processor 244 may cause the vehicle cameras to capture images of the vehicle 102/vehicle surroundings (e.g., images of user's friends and their reactions, when the vehicle 102 may be activated in the third mode), responsive to activating the third mode and responsive to determining that the user 104 is located within the first predefined distance. The processor 244 may further obtain the captured images and transmit (via the transceiver 242) the images to the user device 106, the server 202, and/or the infotainment system 236 for user's reference. The user 104 may share the images with the user's friends and/or post the images on one or more social networking platforms. If approved by the user 104, the processor 244 may also automatically upload the captured images on the social networking platforms.

The examples of the first, second and third vehicle activation modes described above should not be construed as limiting. The user preferences may be associated with other types of vehicle activation modes, which may not be described here, without departing from the present disclosure scope. Further, the vehicle 102/processor 244 may enable the user 104 to customize the vehicle component operation for the vehicle activation mode desired by the user 104. For example, the vehicle 102/processor 244 may enable the user 104 to indicate (via the information associated with the user preferences) that one vehicle interior light may illuminate, even when the vehicle 102 may be operating in the first mode or the "stealth" mode. The processor 244 may be configured to operate the vehicle components in the manner customized by the user 104, when the processor 244 activates the preferred vehicle activation mode and when the user 104 is located within the first predefined distance of the vehicle 102.

Figure 4:
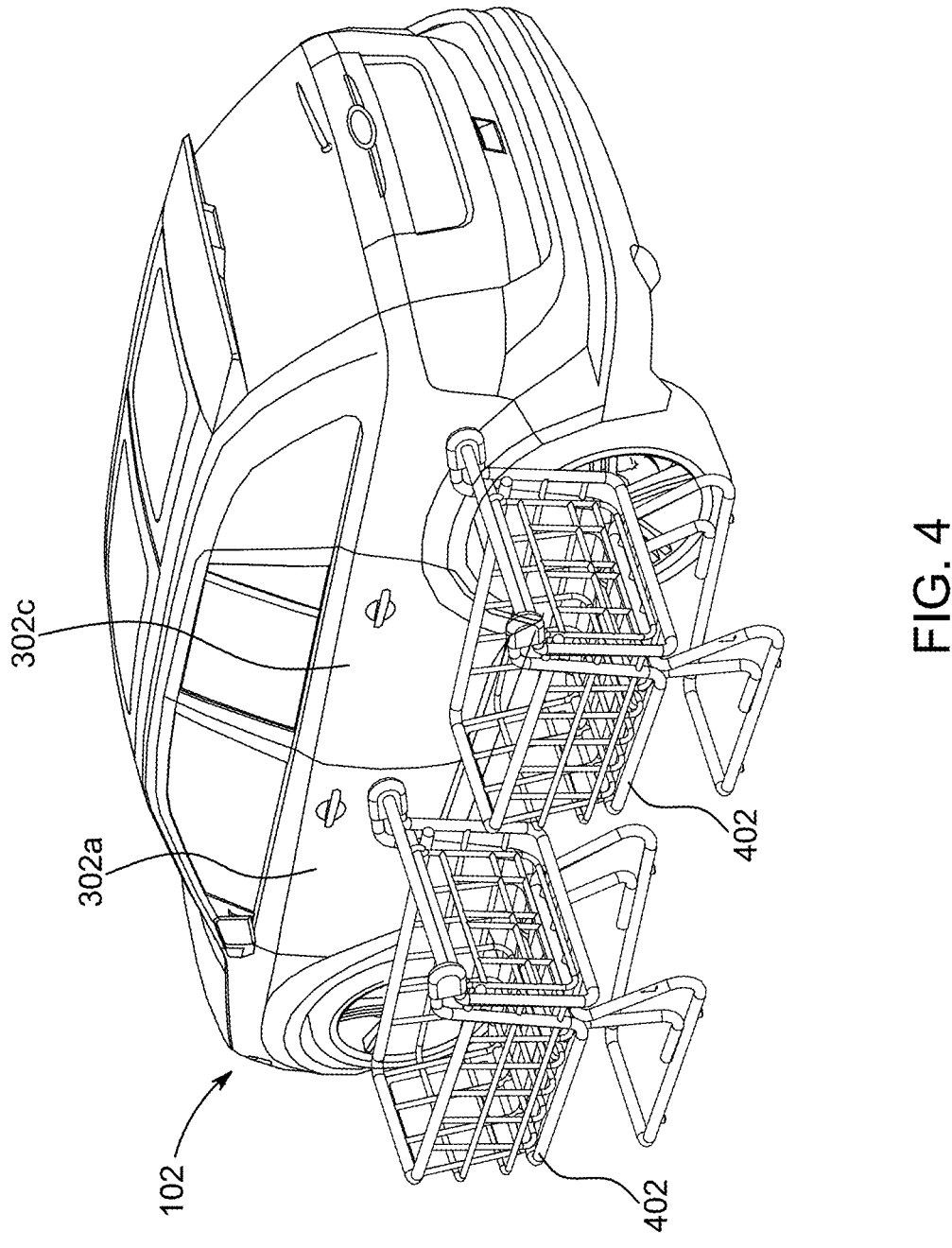
FIG. 4 depicts a view of one or more obstructed vehicle doors in accordance with the present disclosure.

In further aspects, responsive to activating the preferred vehicle activation mode as described above, the processor 244 may determine the available vehicle entry members and the non-available vehicle entry members (if any) based on the inputs obtained from the vehicle sensory system 230, when the user 104 may be approaching the vehicle 102 (as shown in FIG. 3). The processor 244 may further transmit an information associated with the available and non-available vehicle entry members to the user device 106 and/or the sound system 238, so that the user 104 is aware which vehicle entry members are accessible/openable by the user 104 and which are not. For example, if the doors 302a, 302c are not available to be opened (as shown in FIG. 4), the processor 244 may transmit an information indicating non-accessibility of the doors 302a, 302c to the user device 106 and/or the sound system 238, so that the user 104 does not attempt to enter the vehicle 102 via the doors 302a, 302c. If, during the time the user 104 is approaching or walking towards the vehicle 102, the status of available or non-available vehicle entry members changes, the processor 244 may transmit real-time or updated information associated with the available and non-available vehicle entry members to the user device 106 and/or the sound system 238, so that the user 104 is aware of the latest status and may accordingly attempt to enter the vehicle 102.

Furthermore, responsive to activating the preferred vehicle activation mode as described above, the processor 244 may determine the preferred vehicle entry member unlocking and relocking sequence based on the information associated with the user preferences. Based on the preferred vehicle entry member unlocking and relocking sequence, the processor 244 may determine a sequence in which the user 104 may desire the doors 302a-d and/or the tailgate 304 to be unlocked, when the user 104 may be located within a second predefined distance of the vehicle 102 (which may be, for example, 1-2 feet).

Based on the preferred vehicle entry member unlocking and relocking sequence, the processor 244 may determine a first vehicle entry member (e.g., the door 302d) that the user 104 may desire to be unlocked first, when the user 104 is about to enter the vehicle 102 or when the user 104 is located within the second predefined distance of the vehicle 102. Responsive to determining that the door 302d is to be unlocked first for the user 104, the processor 244 may determine whether the door 302d is available/accessible or unavailable/inaccessible (e.g., if the door 302d is obstructed). If the processor 244 determines that the door 302d may be obstructed, the processor 244 may transmit (via the transceiver 242) an error notification to the user device 106 and/or the sound system 238, indicating to the user 104 that the door preferred by the user 104 to be unlocked first is not available/accessible. In such a scenario, the user 104 may attempt to enter the vehicle 102 via any other door, responsive to hearing/viewing the error notification.

On the other hand, if the door 302d is available, the user 104 transmit a first unlock command to the processor 244, when the user 104 reaches close to the door 302d. The processor 244 may obtain the first unlock command and then unlock the door 302d responsive to obtaining the first unlock command. In some aspects, the user 104 may transmit the first unlock command via the user device 106 or the key fob, and the processor 244 may obtain the first unlock command from the user device 106 or the key fob. In other aspects, the processor 244 may obtain the first unlock command via user's facial recognition performed by the vehicle sensory system 230, a voice command provided by the user 104 and captured by the vehicle sensory system 230, a predefined gesture made by the user 104 and captured by the vehicle sensory system 230, and/or the like.

Responsive to unlocking the door 302d, the processor 244 may determine whether a predefined count of occupants associated with the door 302d have entered a vehicle interior portion via the door 302d, based on the inputs obtained from the vehicle sensory system 230 (e.g., via the vehicle's interior cameras, the sitting area sensors, the radar sensors, etc.). In some aspects, an information associated with the predefined count of occupants may be transmitted by the user 104 via the user device 106 to the processor 244, or may be pre-stored by the user 104 in the memory 246 and/or the server 202. As an example, if the user 104 is carrying a kid, the user 104 may indicate that the predefined count of occupants that is expected to enter the vehicle 102 via the door 302d is one (i.e., the kid). On the other hand, if the user 104 is associated with Police, the user 104 may indicate that the predefined count of occupants that is expected to enter the vehicle 102 via the door 302d is two (e.g., two suspects, or a suspect and a user's colleague).

Responsive to determining that the predefined count of occupants has not yet entered the vehicle interior portion via the door 302d, the processor 244 may keep the door 302d open and in the unlocked state. On the other hand, responsive to determining that the predefined count of occupants has entered the vehicle interior portion via the door 302d, the processor 244 may perform a predefined action. In some aspects, the predefined action may include automatically closing the door 302d (if automatic door closing feature is available in the vehicle 102) via the BCM 218. In further aspects, the predefined action may include automatically relocking the door 302d via the BCM 218.

Responsive to relocking the door 302d, the processor 244 may determine whether the user 104 desires any other door to automatically unlock after the door 302d is relocked, based on the preferred vehicle entry member unlocking and relocking sequence. The processor 244 may deactivate the preferred vehicle activation mode responsive to closing and/or the relocking the door 302d (i.e., responsive to performing the predefined action described above), when the processor 244 determines that the user 104 does not desire any other door to automatically unlock after the door 302d is relocked. In some aspects, deactivating the preferred vehicle activation mode may mean that the processor 244 may stop to automatically control operation of the lights 240, the sound system 238, the doors 302a-d, the tailgate 304, and/or the like, as described above.

On the other hand, the processor 244 may determine a second vehicle entry member (e.g., the door 302a) to be unlocked based on the preferred vehicle entry member unlocking and relocking sequence, when the user desires the door 302a to be automatically unlocked after the door 302d is relocked (i.e., after the processor 244 performs the predefined action). In some aspects, when the user 104 may be placing the kid (or a suspect) in the vehicle rear interior portion via the door 302d, the user 104 may desire the vehicle's driver door (i.e., the door 302a) to automatically unlock when the door 302d is relocked (after the kid or the suspect is optimally placed in the vehicle interior portion) and when the user 104 may be moving towards the door 302a. In this case, the user 104 may transmit a second unlock command to unlock the door 302a, when the user 104 may be close to the door 302a (e.g., within the second predefined distance of the door 302a). The user 104 may transmit the second unlock command in the same manner as the first unlock command described above, and the processor 244 may obtain the second unlock command in the same manner as the processor 244 obtains the first unlock command.

Responsive to obtaining the second unlock command, the processor 244 may unlock the door 302a. The processor 244 may further close and/or relock the door 302a when the user 104 enters the vehicle 102 via the door 302a and determine whether any other vehicle entry member/door (e.g., a third vehicle entry member) is to be unlocked after the door 302a is relocked based on the preferred vehicle entry member unlocking and relocking sequence. If no other vehicle entry member is to be unlocked, the processor 244 may deactivate the preferred vehicle activation mode as described above. On the other hand, if another vehicle entry member is to be unlocked, the processor 244 may perform the same operation of unlocking, closing and relocking the vehicle entry member, as described above.

A person ordinarily skilled in the art may appreciate that the feature of providing the preferred vehicle entry member unlocking and relocking sequence to the vehicle 102 may assist not just the user 104 who may be placing a kid or grocery items in the vehicle or an authority personnel (e.g., a Police officer), but may also assist commercial drivers. As an example, when the vehicle 102 may be operating in a "livery" mode as the preferred vehicle activation mode, the user 104/driver may provide information associated with a prescribed sequence of vehicle entry member locking and unlocking, such that the driver may conveniently get out of the vehicle 102, stow luggage and/or let the passenger in the vehicle 102, and then return to the driver's sitting area, without keeping any of the vehicle entry members unnecessarily unlocked for a time duration that is more than required.

The vehicle 102/processor 244 may perform one or more additional actions or provide additional features that may enhance user's experience of approaching and accessing the vehicle 102. For example, when the processor 244 determines that the first vehicle entry member that the user 104 desires the processor 244 to unlock first is of a predefined type (e.g., the tailgate 304), the processor 244 may disable a vehicle powertrain shift from park responsive to performing the predefined action described above (i.e., responsive to automatically closing and/or relocking the tailgate 304). In an exemplary aspect, when the user 104 may be scared or may be trying to hide from a malicious person, the user 104 may desire to enter the vehicle 102 via the tailgate 304 (as opposed to via the regular doors 302*a-d*). In this case, the user 104 may indicate in the preferred vehicle entry member unlocking and relocking sequence that the user 104 desires the processor 244 to unlock the tailgate 304. Responsive to obtaining such an indication, the processor 244 may unlock the tailgate 304 when the processor 244 obtains the first unlock command as described above and then close/relock the tailgate 304 when the user 104 has entered the vehicle interior portion via the tailgate 304. The processor 244 may then disable the vehicle powertrain shift from park, so that no user may intentionally or unintentionally drive/move the vehicle 102. In this manner, the processor 244 may enable the user 104 to conveniently and optimally receive shelter in the vehicle interior portion.

In further aspects, responsive to determining that the door 302*d* should be unlocked first (followed by the door 302*a*) based on the preferred vehicle entry member unlocking and relocking sequence as described above, the processor 244 may determine if an attempt to open a vehicle entry member different from the door 302*d* (or the door 302*a* in the sequence) is made. The processor 244 may transmit, via the transceiver 242, an alert notification and/or one or more images captured by the vehicle cameras to the user device 106 and/or the server 202 (or the Police), responsive to determining that an attempt to open a vehicle entry member different from the door 302*d* is made. Such an action by the processor 244 may ensure that the vehicle 102 is not misused or accessed by any unauthorized user.

Figure 5:
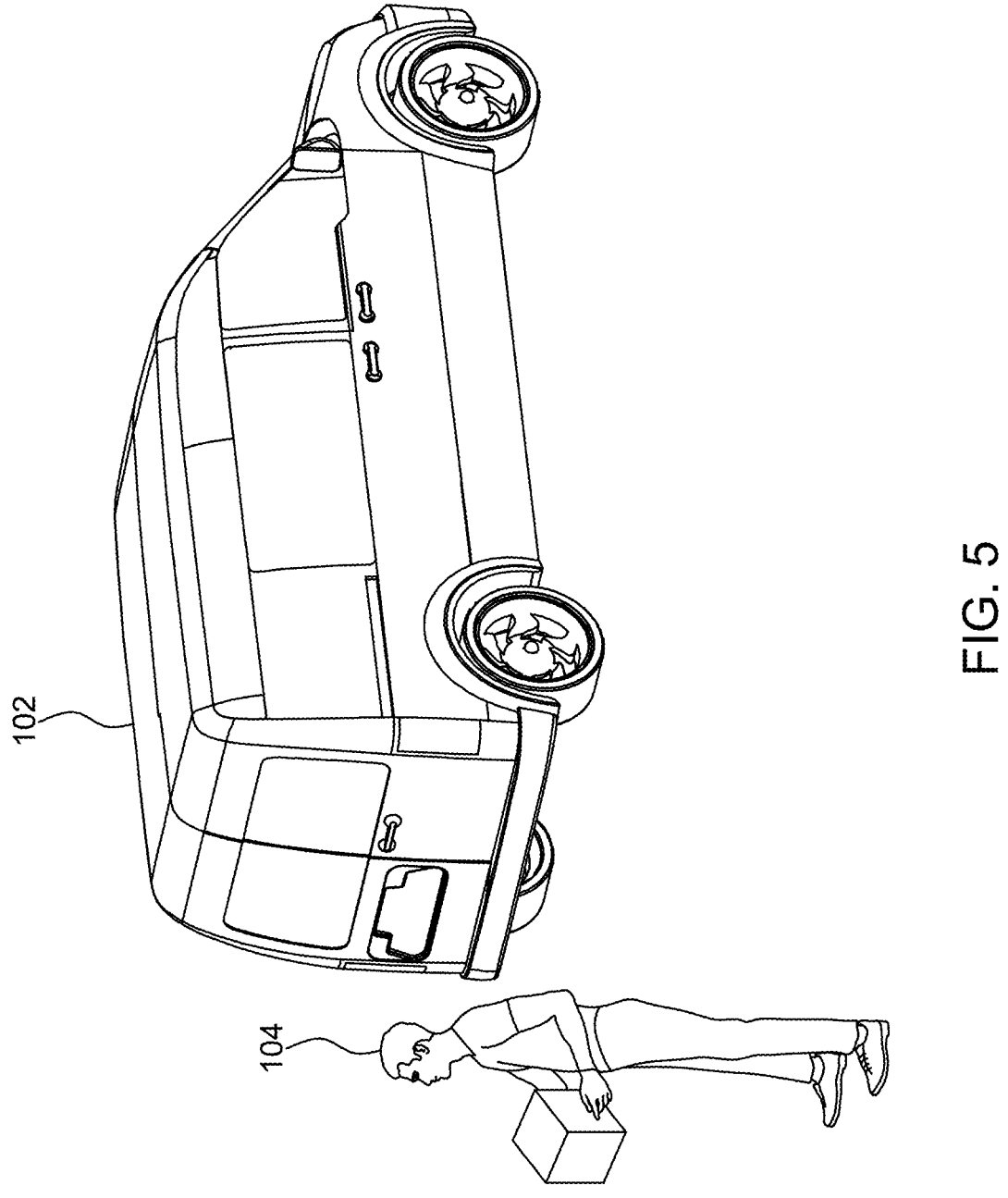
FIG. 5 depicts a view of a user moving away from a delivery vehicle in accordance with the present disclosure.

Furthermore, when the vehicle 102 is a delivery vehicle (as shown in FIG. 5), the user 104 may indicate in the information associated with the user preferences a manner in which the doors 302*a-d* and/or the tailgate 304 should lock or unlock when the user 104 approaches the vehicle 102 or moves away from the vehicle 102 and who should be allowed to operate/drive the vehicle 102. As an example, when the preferred vehicle activation mode is a fourth mode or a "delivery" mode, the processor 244 may monitor the user movement in proximity to the vehicle 102 based on the inputs obtained from the vehicle sensory system 230 and/or the TCU 224. Responsive to determining that the user 104 has moved a predefined distance (e.g., 6-10 feet) away from the vehicle 102 (as shown in FIG. 5), the processor 244 may automatically close and/or lock all the doors 302*a-d* and the tailgate 304, to secure the packages stored in the vehicle 102. Further, when the user 104 returns to the vehicle 102, the processor 244 may open/unlock one or more vehicle entry members in the sequence as included/indicated by the user 104 in the user preferences associated with the preferred vehicle entry member unlocking and relocking sequence, as described above.

Furthermore, when the preferred vehicle activation mode is the fourth mode or the "delivery" mode, the processor 244 may authenticate the user 104 when the user 104 enters the vehicle interior portion (e.g., based on facial recognition technology or inputs obtained from the vehicle sensory system 230) and enable the user 104 to operate and/or drive the vehicle 102 only when the user 104 is authenticated. Stated another way, the processor 244 may disable vehicle operation when the user 104 is not authenticated, thereby preventing misuse of the vehicle 102 by any unauthorized person.

A person ordinarily skilled in the art may appreciate from the description above that the processor 244 activates the preferred vehicle activation mode when the vehicle 102 is not in operation (i.e., when the vehicle engine is switched off) and when the user 104 approaches the vehicle 102. In some aspects, the user 104 may further indicate/include in the user preferences a preferred vehicle engine activation mode, in order to optimize the vehicle's key off load utilization. The processor 244 may automatically activate the vehicle engine to power the vehicle components or not activate the vehicle engine (and let the vehicle battery power the vehicle components) based on the preferred vehicle engine activation mode.

For example, the processor 244 may activate the vehicle engine and let the vehicle engine power the lights 240, the sound system 238, the doors 302*a-d*, and/or the like, responsive to activating the preferred vehicle activation mode when the preferred vehicle engine activation mode is a first vehicle engine activation mode. In the first vehicle activation mode, the user 104 may desire the vehicle engine to power the vehicle components described above and not the vehicle battery, thereby ensuring that key-off load utilization is optimized and the vehicle battery energy is conserved.

On the other hand, the processor 244 may activate the vehicle engine responsive to deactivating the preferred vehicle activation mode when the preferred vehicle engine activation mode is a second vehicle engine activation mode. In this case, the vehicle battery may power the vehicle components when the preferred vehicle activation mode may be in the active state (or is activated). In the second vehicle activation mode, the user 104 may not desire the vehicle engine to be activated till the user 104 enters the vehicle 102, to ensure that the noise associated with the vehicle engine operation is not generated till the user 104 is secured inside the vehicle 102. In an exemplary aspect, the user 104 may prefer the second vehicle activation mode when the user 104 does not want to draw focus on the user 104/vehicle 102 when the user 104 approaches the vehicle 102 or when the preferred vehicle activation mode may be the first/stealth mode.

In this manner, the vehicle 102/processor 244 may enable the user 104 to customize the vehicle's energy utilization (or optimize the vehicle's key-off load) during the vehicle activation mode, based on user's requirements and preferences.

Figure 6:
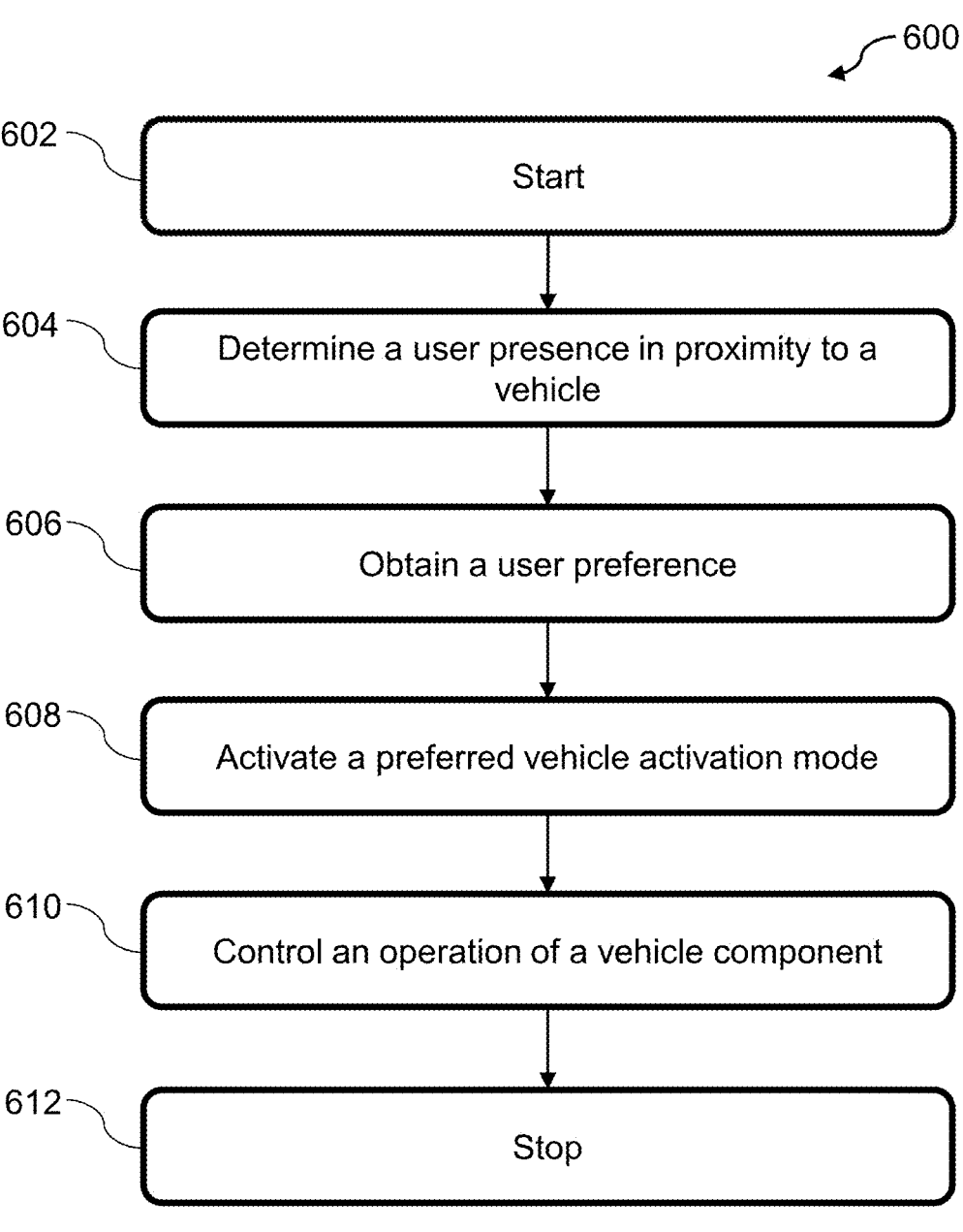
FIG. 6 depicts a flow diagram of a method to control vehicle operation upon user arrival in accordance with the present disclosure.

FIG. 6 depicts a flow diagram of a method 600 to control vehicle operation upon user arrival in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include determining, by the processor 244, the user presence in proximity to the vehicle 102 based on the inputs obtained from the vehicle sensory system 230 and/or the TCU 224. At step 606, the method 600 may include obtaining, by the processor 244, the user preferences associated with the preferred vehicle activation mode, responsive to determining the user presence, as described above in conjunction with FIG. 2.

At step 608, the method 600 may include activating, by the processor 244, the preferred vehicle activation mode. At step 610, the method 600 may include controlling, by the processor 244, operations of one or more vehicle components (e.g., the lights 240, the sound system 238, the doors 302a-d, the tailgate 304, the vehicle engine, and/or the like) based on the preferred vehicle activation mode.

The method 600 may end at step 612.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a sensor unit configured to detect a presence of a user in proximity to the vehicle; and
a processor configured to:
determine a user presence in proximity to the vehicle based on inputs obtained from the sensor unit;
obtain a user preference associated with a preferred vehicle activation mode, from a plurality of vehicle activation modes, and a preferred vehicle entry member unlocking and relocking sequence, from a plurality of vehicle entry member unlocking and relocking sequences, responsive to determining the user presence;
activate the preferred vehicle activation mode;
determine a first vehicle entry member and a second vehicle entry member to be unlocked based on the preferred vehicle entry member unlocking and relocking sequence, responsive to activating the preferred vehicle activation mode;
obtain a first unlock command;

unlock the first vehicle entry member responsive to obtaining the first unlock command;

automatically relock the first vehicle entry member;

automatically unlock the second vehicle entry member responsive to automatically relocking the first vehicle entry member; and control an operation of a vehicle component based on the preferred vehicle activation mode.

2. The vehicle of claim 1, wherein the processor is further configured to:

disable one or more vehicle lights, one or more vehicle sound systems, and a vehicle engine when the preferred vehicle activation mode is a first mode;

activate at least one of the one or more vehicle lights, one or more vehicle sound systems, or vehicle engine revolutions in a first predefined pattern when the preferred vehicle activation mode is a second mode; and activate at least one of the one or more vehicle lights, one or more vehicle sound systems, or the vehicle engine revolutions in a second predefined pattern when the preferred vehicle activation mode is a third mode, wherein the second predefined pattern is different from the first predefined pattern.

3. The vehicle of claim 2, wherein the processor is further configured:

cause one or more vehicle cameras to capture an image associated with a vehicle surrounding when the preferred vehicle activation mode is the third mode;

obtain the image from the one or more vehicle cameras; and transmit the image to at least one of a user device, a server or a vehicle Human-Machine Interface (HMI).

4. The vehicle of claim 1, further comprising a memory configured to store an information associated with the user preference, wherein the processor is further configured to:

obtain the information from the memory responsive to determining the user presence;

determine the user preference based on the information obtained from the memory; and determine the preferred vehicle activation mode based on the user preference.

5. The vehicle of claim 1, wherein the processor obtains the user preference from at least one of a user device or a key fob.

6. The vehicle of claim 1, wherein the sensor unit is further configured to determine one or more available vehicle entry members that are available to open and one or more non-available vehicle entry members that are not available to open, and wherein the processor is further configured to transmit an information associated with the one or more available vehicle entry members and the one or more non-available vehicle entry members to a user device or a vehicle sound system responsive to activating the preferred vehicle activation mode.

7. The vehicle of claim 1, wherein the first vehicle entry member is a rear door of the vehicle, and wherein the second vehicle entry door is a front door of the vehicle.

8. The vehicle of claim 1, wherein the processor is further configured to:

determine that the first vehicle entry member is obstructed based on the inputs obtained from the sensor unit, responsive to determining that the first vehicle entry member is to be unlocked; and transmit an error notification to a user device or a vehicle sound system responsive to determining that the first vehicle entry member is obstructed.

9. The vehicle of claim 1, wherein the processor obtains the first unlock command via at least one of a user device, a key fob, a facial recognition performed by the sensor unit, a voice command, or a predefined gesture made by the user and captured by the sensor unit.

10. The vehicle of claim 1, wherein the processor is further configured to:

determine that a predefined count of occupants associated with the first vehicle entry member has entered a vehicle interior portion via the first vehicle entry member, responsive to unlocking the first vehicle entry member; and perform a predefined action responsive to determining that the predefined count of occupants has entered the vehicle interior portion, wherein the predefined action comprises at least one of automatically closing the first vehicle entry member or relocking the first vehicle entry member.

11. The vehicle of claim 10, wherein the processor is further configured to:

determine a third vehicle entry member to be unlocked based on the preferred vehicle entry member unlocking and relocking sequence, responsive to performing the predefined action;

obtain a second unlock command; and unlock the third vehicle entry member responsive to obtaining the second unlock command.

12. The vehicle of claim 10, wherein the processor is further configured to deactivate the preferred vehicle activation mode responsive to performing the predefined action.

13. The vehicle of claim 12, wherein the user preference is further associated with a preferred vehicle engine activation mode, and wherein the processor is further configured to:

activate a vehicle engine responsive to activating the preferred vehicle activation mode when the preferred vehicle engine activation mode is a first vehicle engine activation mode; and activate the vehicle engine responsive to deactivating the preferred vehicle activation mode when the preferred vehicle engine activation mode is a second vehicle engine activation mode.

14. The vehicle of claim 10, wherein the processor is further configured to:

determine that the first vehicle entry member is of a predefined type; and disable a vehicle powertrain shift from park responsive to determining that the first vehicle entry member is of the predefined type and responsive to performing the predefined action.

15. The vehicle of claim 1, wherein the processor is further configured to:

determine that an attempt to open a vehicle entry member different from the first vehicle entry member is made, responsive to determining that the first vehicle entry member is to be unlocked based on the preferred vehicle entry member unlocking and relocking sequence; and transmit at least one of an alert notification or one or more images captured by one or more vehicle cameras to a user device or a server, responsive to determining that the attempt to open the vehicle entry member different from the first vehicle entry member is made.

16. The vehicle of claim 1, wherein the processor is further configured to:

determine that the user has moved a predefined distance away from the vehicle based on the inputs obtained from the sensor unit; and lock all vehicle doors responsive to determining that the user has moved the predefined distance away from the vehicle, when the preferred vehicle activation mode is a fourth mode.

17. The vehicle of claim 16, wherein the processor is further configured to:

authenticate the user when the user enters a vehicle interior portion, when the preferred vehicle activation mode is the fourth mode; and disable a vehicle operation when the user is not authenticated.

18. The vehicle of claim 1, wherein the sensor unit comprises at least one of a vehicle camera, a Radio Detection And Ranging (radar) sensor, a Light Detection and Ranging (lidar) sensor, an ultrasonic sensor, or a Telematics Control Unit (TCU).

19. A method comprising:

determining, by a processor, a user presence in proximity to a vehicle based on inputs obtained from a sensor unit, wherein the sensor unit is configured to detect a presence of a user in proximity to the vehicle;

obtaining, by the processor, a user preference associated with a preferred vehicle activation mode, from a plurality of vehicle activation modes, and a preferred vehicle entry member unlocking and relocking sequence, from a plurality of vehicle entry member unlocking and relocking sequences, responsive to determining the user presence;

activating, by the processor, the preferred vehicle activation mode;

determining, by the processor, a first vehicle entry member and a second vehicle entry member to be unlocked based on the preferred vehicle entry member unlocking and relocking sequence, responsive to activating the preferred vehicle activation mode;

obtaining, by the processor, a first unlock command;

unlocking, by the processor, the first vehicle entry member responsive to obtaining the first unlock command;

automatically relocking, by the processor, the first vehicle entry member;

automatically unlocking, by the processor, the second vehicle entry member responsive to automatically relocking the first vehicle entry member; and controlling, by the processor, an operation of a vehicle component based on the preferred vehicle activation mode.

20. A non-transitory computer-readable storage medium having instructions stored thereupon which, when executed by a processor, cause the processor to:

determine a user presence in proximity to a vehicle based on inputs obtained from a sensor unit, wherein the sensor unit is configured to detect a presence of a user in proximity to the vehicle;

obtain a user preference associated with a preferred vehicle activation mode, from a plurality of vehicle activation modes, and a preferred vehicle entry member unlocking and relocking sequence, from a plurality of vehicle entry member unlocking and relocking sequences, responsive to determining the user presence;

activate the preferred vehicle activation mode;

determine a first vehicle entry member and a second vehicle entry member to be unlocked based on the preferred vehicle entry member unlocking and relocking sequence, responsive to activating the preferred vehicle activation mode;

obtain a first unlock command;

unlock the first vehicle entry member responsive to obtaining the first unlock command;

automatically relock the first vehicle entry member;

automatically unlock the second vehicle entry member responsive to automatically relocking the first vehicle entry member; and control an operation of a vehicle component based on the preferred vehicle activation mode.

\* \* \* \* \*